United States Patent [19]

Harp

[11] Patent Number: 4,496,275

[45] Date of Patent: Jan. 29, 1985

[54] APPARATUS AND METHOD FOR TIPPING CARGO CONTAINERS

[75] Inventor: James J. Harp, Annandale, Va.

[73] Assignee: Resource Ventures, Inc., Alexandria, Va.

[21] Appl. No.: 374,706

[22] Filed: May 4, 1982

[51] Int. Cl.³ .................... B65G 63/00; B65G 65/34; B63B 27/00; B66C 1/00

[52] U.S. Cl. ................... 414/420; 414/139; 414/421; 414/754; 414/786; 294/81 SF

[58] Field of Search ............... 414/354, 359, 419–422, 414/786, 754, 763, 764, 766, 783, 607, 608, 137–143; 294/81 SF, 67 R, 67 D, 67 DA, 67 DC, 67 BB, 86 R; 222/166, 604, 605; 212/130, 242, 251, 259

[56] References Cited

U.S. PATENT DOCUMENTS

| | | | |
|---|---|---|---|
| 1,026,752 | 5/1912 | Kirchner | 294/67 X |
| 1,280,531 | 10/1918 | Pattison | 414/366 |
| 1,849,182 | 3/1932 | Frey | 294/73 |
| 2,713,431 | 7/1955 | Koehler | 414/422 |
| 2,796,283 | 6/1957 | Grazier | 294/69 |
| 3,089,725 | 5/1963 | Bertels | 414/419 X |
| 3,125,236 | 3/1964 | Huff | 414/422 X |
| 3,230,003 | 1/1966 | McAfoos, Jr. et al. | |
| 3,670,912 | 6/1972 | Dunbar | 414/420 |
| 3,897,881 | 8/1975 | Brock | 294/73 X |
| 3,915,311 | 10/1975 | Ball et al. | 414/766 |
| 4,009,790 | 3/1977 | Brock | 294/73 X |
| 4,111,310 | 9/1978 | Stobb | 414/783 |
| 4,256,429 | 3/1981 | Dwyer | 414/763 X |
| 4,272,217 | 6/1981 | Sefcik | 414/420 |
| 4,396,218 | 2/1983 | Stevens | 294/81 SF |
| 4,402,543 | 9/1983 | Simpson | 294/81 SF |

FOREIGN PATENT DOCUMENTS

| | | | |
|---|---|---|---|
| 2700079 | 7/1978 | Fed. Rep. of Germany | 414/419 |
| 734123 | 5/1980 | U.S.S.R. | 294/73 |
| 779270 | 11/1980 | U.S.S.R. | |

Primary Examiner—Robert J. Spar
Assistant Examiner—David A. Bucci
Attorney, Agent, or Firm—Epstein & Edell

[57] ABSTRACT

A tipping adapter permits a cargo container, which is suspended from a hoisting device, such as a gantry cantilever crane, to be selectively tipped about an axis extending longitudinally through the container so that bulk material, such as coal, grain, etc., may be tipped from the container into a ship's hold or other receiving space. The adapter includes a drive support frame which connects to the crane or a crane-supported container spreader at the connection points normally used in connecting the container to the spreader. A pivotal frame connects to a container in the same manner in which the spreader connects to the container. The drive support and pivotal frames are pivotally engaged so that one or more drive motors, mounted on the drive support frame, can be used to selectively pivot the pivotal frame and thereby tip the container. Controls are placed at the crane control panel to permit selective container engagement and tipping, and interlocks are provided to prevent tipping of the container before it is properly engaged.

34 Claims, 12 Drawing Figures

APPARATUS AND METHOD FOR TIPPING CARGO CONTAINERS

BACKGROUND OF THE INVENTION

1. Technical Field

The present invention relates generally to the handling of bulk materials, such as coal, grain, etc., for shipping purposes. More particularly, the present invention relates to an improved method and apparatus for adapting gantry-supported container loading facilities to handle such bulk materials.

2. Prior Art

Bulk materials, such as coal, grain, etc., are loaded into the holds of ships primarily with the use of conveyors which are snaked through the hold to deliver the material to the proper location. The conveyor equipment is expensive, requires a considerable amount of time to set up for use and is complex to handle. It would be far more convenient to load bulk material with the use of standard cargo containers of the type which are hoisted and positioned by means of a container spreader suspended from a gantry cantilever crane. The advantages which would accrue to the use of such containers by handling bulk materials are numerous. For example, cargo containers of bulk material could be transported to and from shipping ports by a wide variety of transport modes, such as flat-bed rail cars, substantially all trucks, etc., whereas loose bulk material is limited to vehicles which are specially designed for that purpose. In addition, containerized bulk material does not pollute the environment and is less susceptible to accidental explosions which would result from loose dust in the air; the dust, of course, is retained within the container when the bulk material is containerized. Whereas loose bulk material leaves a dust or powder which renders the ship's hold unusable for transporting other products for a return trip, containerization of the material avoids this problem. Moreover, containerization permits much more precise positioning of the material within the hold as compared to conveying bulk material in loose form into the hold. Containerization also provides weather protection for the bulk material; this is extremely important in the case of coal, which when exposed to rain, forms sulfuric acid. Further, coal, grain, and other bulk products, when containerized, can be transported from any port having container-handling facilities; presently, these materials can only be transported from a port having special bulk material handling facilities. Containerized bulk material can be readily stored in transit to a shipping port without tying up the shipping vehicle, whereas loose bulk material can be readily stored in transit only in the specially provided railroad cars, etc.

Considering all of the aforementioned advantages of handling bulk material in cargo containers, one might wonder why this has not been the standard mode of shipping bulk material in the past. The reason lies in the fact that, until the present invention, there has been no practical technique for removing the bulk material from the containers at the destination port. Cargo containers are conventionally hoisted and positioned by means of container spreaders which are suspended from gantry cantilever cranes. Such cranes have no capability for tipping the containers to pour out the container contents. Attempts have been made in the past to tip such containers from a ground-supported position about a bottom edge of the container; however, the tipping action was not easily controlled and the side walls of the standard cargo containers tended to buckle from the weight of the material during tipping. The absence of tipping control was due primarily to the fact that the tipping axis was the bottom edge of the container rather than an axis passing through, or substantially through, the container center of gravity. As a consequence, the force required to pivot the container varies considerably at different positions during the tipping operation.

SUMMARY AND OBJECTS OF THE PRESENT INVENTION

It is, therefore, an object of the present invention to provide a method and apparatus for adapting a container-handling port facility to handle bulk materials.

It is another object of the present invention to provide a method and apparatus for tipping a cargo container supported from a gantry cantilever crane, with or without a container spreader, and wherein, if a standard container spreader is used, the crane and container require no modification.

Another object of the present invention is to provide an adapter for a gantry supported container which permits the supported cargo container to be controllably tipped in either direction about its center of gravity to pour bulk material therefrom.

It is still another object of the present invention to provide a method of pouring bulk materials from a suspended container.

In a more general sense, it is an object of the present invention to facilitate handling of bulk materials at shipping ports by containerizing the material and adapting the port facility so that the container contents may be emptied by tipping the container.

In accordance with the present invention, a tipping adapter is provided for connection between the container spreader and the cargo container. A drive support frame connects to the spreader in the same manner as the container. A pivotal frame connects to the container in the same manner as the spreader. The drive support frame and pivotal frame are thereby interposed between the spreader and container. The drive support frame and pivotal frame are pivotally engaged about an axis extending longitudinally through the container at or near the container center of gravity. Drive motors disposed on the drive support frame are selectively actuable to pivot the pivotal frame about the pivot axis in either direction. The pivotal frame includes side members which extend along the top portion of the container side walls to provide structural support during tipping. Interlocks are provided to assure that the tipping drive motors are disabled unless the container is properly engaged by the pivotal frame member and to prevent movement of the gantry during the engagement and disengagement operations of the container. By pivoting the pivotal frame relative to the drive support frame by means of the selectively actuable drive motors, the container may be selectively tipped to pour some or all of the bulk material contents therefrom.

The tipping adapter permits controlled tipping of the container and thereby renders practical the containerized transport of bulk materials. In the specific embodiment disclosed, there are limit switches provided for limiting the drive motor actuation to strokes of 180° and 360°; of course, strokes of different angular distance may be employed where desired. All electrical wiring, motors, fixtures and lights are provided in explosion-proof conduits and the like to eliminate the hazard of potential explosion which exists in the handling of granular and powdered bulk material. The locks employed to secure the drive support frame to the container spreader and to secure the pivotal frame to the container are the same type of locks employed to secure the container to the spreader and are of the self-locking type.

In the preferred embodiment described herein, the drive support member is adapted to be connected to a container spreader suspended from a gantry. It will be appreciated that, for some applications, the spreader can be eliminated and the drive support member can be connected directly to the gantry block or blocks.

The above and still further objects, features and advantages of the present invention will become apparent upon consideration of the following detailed description of a specific embodiment of the invention, especially when taken in conjunction with the accompanying drawings.

DESCRIPTION OF THE PREFERRED EMBODIMENT

Figure 1:
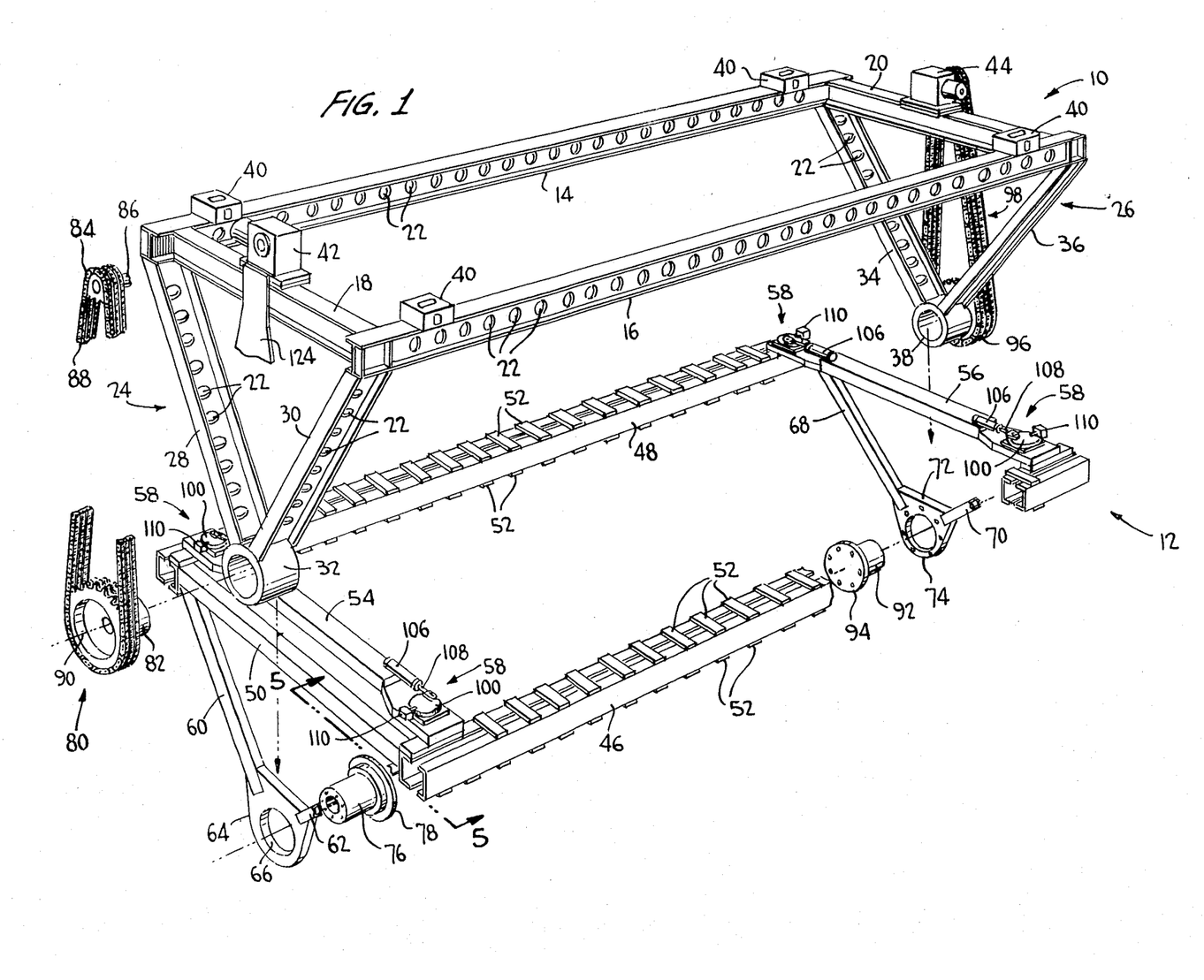
FIG. 1 is a partially diagrammatic exploded view in perspective of the elements of the preferred embodiment of the tipping adapter of the present invention.
Figure 2:
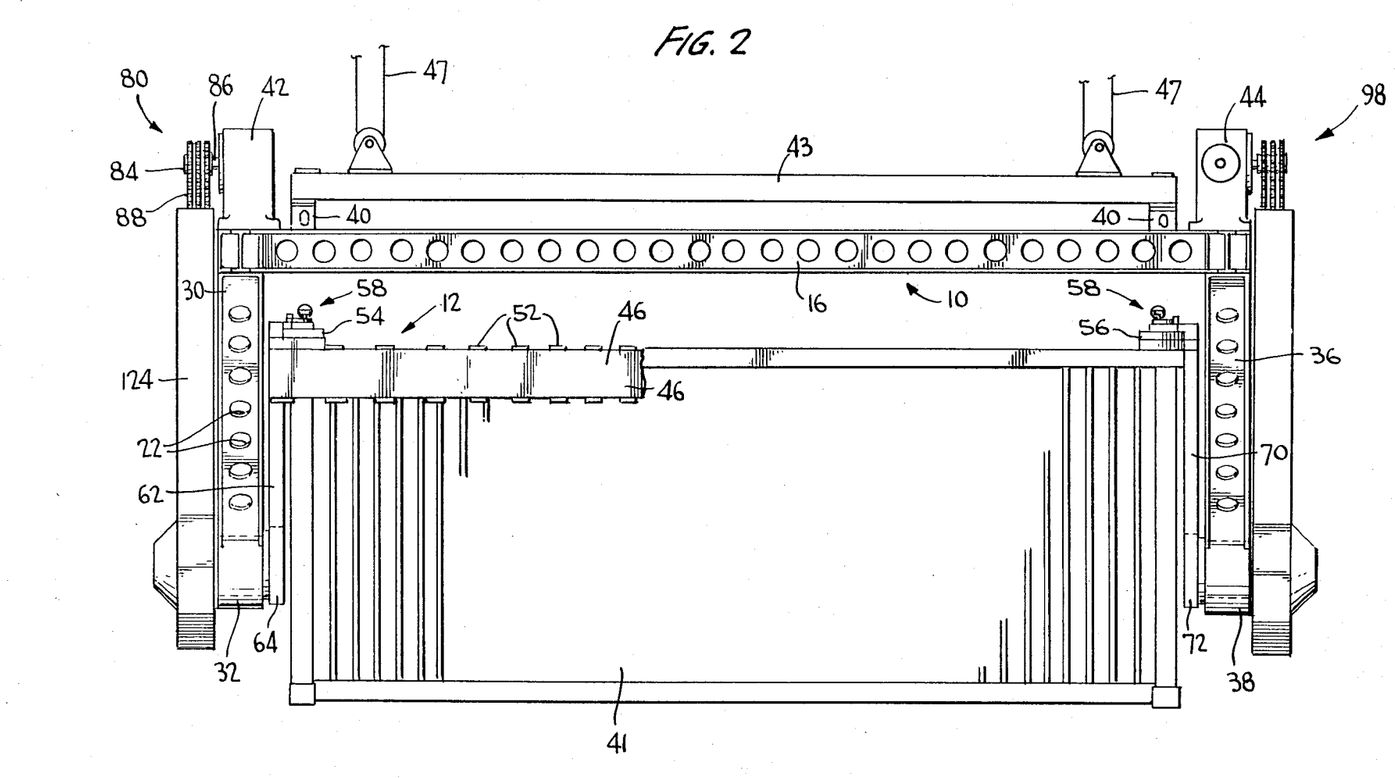
FIG. 2 is a side view in elevation of the tipping adapter of FIG. 1 shown connected to a container spreader and a cargo container.

Referring specifically to FIGS. 1 and 2 of the accompanying drawings, the tipping adapter of the present invention includes a drive support member 10 and a pivotal frame member 12. The drive support member 10 is a rectangular frame made up from mutually opposite side I-beams 14 and 16 and mutually opposite end I-beams 18 and 20. The beams are welded or riveted together to provide a structuraly solid frame member about an open rectangular space. In the illustrated preferred embodiment, which is adapted for use with a container 41 having a rectangular transverse cross-section with its side walls longer than its end walls, the side beams 14, 16 are longer than end beams 18 and 20. The web portions of the beams 14, 16, 18 and 20 are provided with through holes 22 along their lengths to reduce the weight of the beams.

A pair of V-shaped support members 24, 26 are disposed at opposite ends of the drive support member 10. The V-shaped support member 24 includes a pair of I-beams 28, 30 which are secured, by welding, rivets or the like, to the underside of the ends of respective side beams 14, 16. Beams 28 and 30 converge downwardly to join the periphery of an annular sleeve 32 which is welded or otherwise joined to the beam ends. A pair of I-beams 34, 36 form the V-shaped support member 26 and are similarly secured at their ends to the underside of the opposite ends of side beams 14 and 16. The downwardly converging beams 34 and 36 terminate at the periphery of an annular sleeve 38. The V-shaped support members 24, 26 thus depend from the rectangular frame comprising drive support member 10 in respective planes which are perpendicular to the plane of the frame. It is noted that V-shaped frame members 24, 26 are disposed at the ends of side beams 14, 16, whereas the end beams 18, 20 are secured to the side beams inboard of the V-shaped support members. The beams 14, 16, 18, 20, 28, 30, 34 and 36 are made of a structurally strong metal, such as steel. It is also to be noted that the beams 28, 30, 34 and 36 of the V-shaped support members are also provided with apertures or through holes 22 in their web portions to reduce the weight of the overall drive support member 10. It is to be understood that the drive support member 10, although illustrated as being of a frame configuration, may be a solid member of any general configuration consistent to the operation of the adapter described herein; the frame configuration, however, is believed to be most efficient because it is lightweight and structurally sound.

Four lock-receiving members 40 are secured atop the rectangular frame, two each on side beams 14 and 16 with the lock-receiving members 40 positioned proximate each end of beams 14, 16, inboard of the respective end beams 18, 20. The spacing between lock-receiving members 40 corresponds to the spacing between similar lock-receiving members 45 provided on a standard cargo container 41 used with a cargo container spreader 43 suspended by cables 47 from a gantry cantilever crane in a container loading port facility. In this manner, the container spreader 43 can be readily connected, by means of its twist lock members described hereinbelow, to the drive support member in the same manner as it would be connected directly to the cargo container 41. Lock-receiving members 40 are of the type illustrated as part of the twist lock arrangement in Appendix A in the American National Standard, Basic Requirements For Cargo Containers, ANSI MH5.1-1971.

A first tip motor 42 is secured to the top of end beam 18. A second tip motor is secured to the top side of end beam 20. The tip motors 42 and 44 are selectively actuable simultaneously to effect tipping of a cargo container in the manner described hereinbelow.

The pivotal frame 12 is also generally rectangular with sides 46, 48 longer than its ends 50, it being noted that one end 50 is not visible in FIG. 1. Sides 46, 48 are each fabricated from a pair of C-section beams having their open sides facing one another and joined top and bottom by a plurality of longitudinally spaced and transversely extending connecting ribs 52 welded to the two beams. Sides 46 and 48 are therefore hollow to reduce the frame weight, but are structurally strong and rigid to support the cargo container during tipping. Ends 50 are box beams of rectangular or square section and are secured between respective ends of sides 46, 48 by welding or the like to provide a rigid frame structure. A pair of connector bars 54, 56 extend transversely across the frame from locations atop sides 46, 48 to which bars 54, 56 are secured. Bars 54, 56 are disposed slightly inboard of the ends 50 of the pivotal frame and are provided with twist lock members 58 proximate their ends. The twist lock members 58 extend downwardly through connector bars 54, 56 and are spaced to selectively engage lock-receiving openings in the rim of a cargo container in the manner described below. For the present, it is sufficient to note that the twist lock members are the same as those provided on the standard cargo container spreader 43 per ANSI MH5.1-1971 so that they may engage the container 41 in place of the spreader.

A pair of gusset members 60, 62 have one end secured to respective ends of the underside of one connector bar 50 and converge downwardly to join a plate 64 having a circular aperture 66. Similar gusset members 68, 70 are secured to opposite ends of the underside of the other connector bar 50 (not shown) and converge downwardly to join plate 72 which is apertured at 74. The apertures 66 and 74 are coaxially aligned.

A short hollow driven shaft 76 has an annular flange 78 at one end and extends through aperture 66 in plate 64 and through sleeve 32 which is coaxially aligned with aperture 66. The opposite end of shaft 66 is bolted to a rotatably driven plate 82 which forms part of a tipper drive transmission 80. The drive transmission 80 is a drive chain transmission which is disposed in a vertical plane outboard of the V-shaped support member 24. The drive transmission includes a drive sprocket 84 which is rotatable by the drive shaft 86 of motor 42. One or more chain belts 88 link the drive sprocket 84 to a driven sprocket 90 which is coaxially disposed with and secured to rotatably driven plate 82. Flange 78 of driven shaft 76 is bolted to plate 64 so that rotary motion of the drive shaft 86 of motor 42 is transmitted through the drive transmission 80 and the driven shaft 76 to rotate pivotal frame 12 relative to drive support member 10.

A similar arrangement is provided at the opposite end of the tipping adapter wherein a short hollow driven shaft 92 has an annular flange 94 bolted to plate 72 such that the shaft extends through plate aperture 74 and sleeve 38 into driven engagement with a driven sprocket 96 of a drive transmission 98. The drive transmission 98 is identical in all respects to the drive transmission 80 and links the drive shaft of motor 44 to driven shaft 92 to assist motor 42 in rotating the pivotal frame member 12 relative to the drive support member 10.

The pivotal frame member 12 has its sides 46, 48 disposed along the tops of the sides of container 41 when the pivotal frame member is properly positioned to permit the twist lock members 58 to engage the lock-receiving members 45 of the container. In this manner, the frame sides 46, 48 serve to reinforce the container sides during tipping so that the container sides do not buckle under the weight of the contained bulk material.

Figure 3:
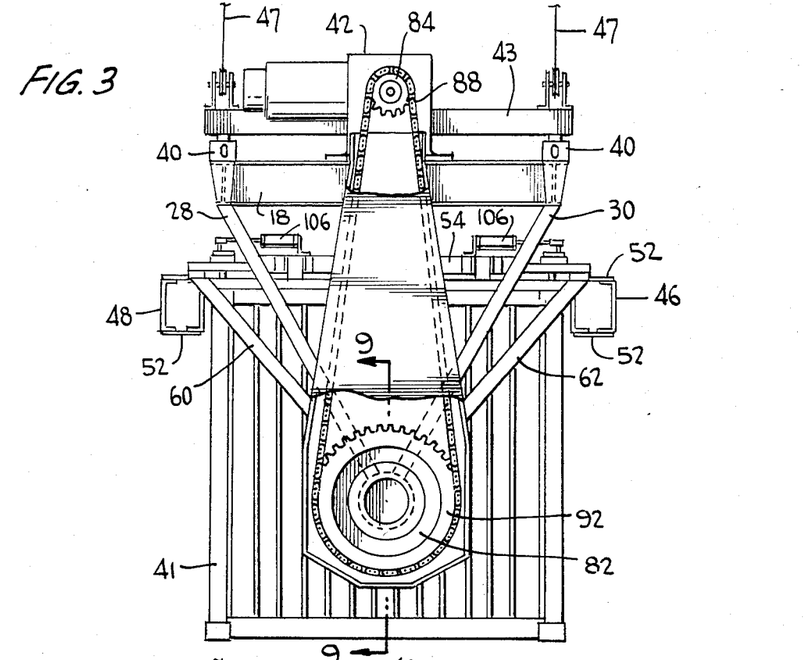
FIG. 3 is an end view in elevation of the apparatus of FIG. 2 with the container shown upright.
Figure 4:
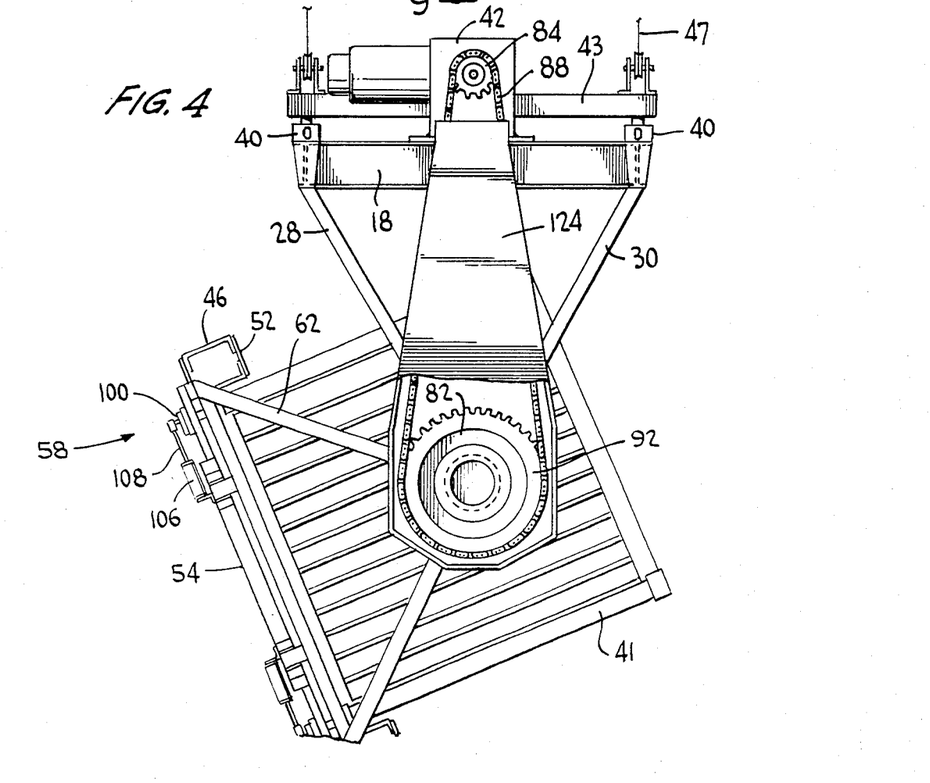
FIG. 4 is a view similar to FIG. 3 with the container shown during a tipping operation.
Figures 11, 12:
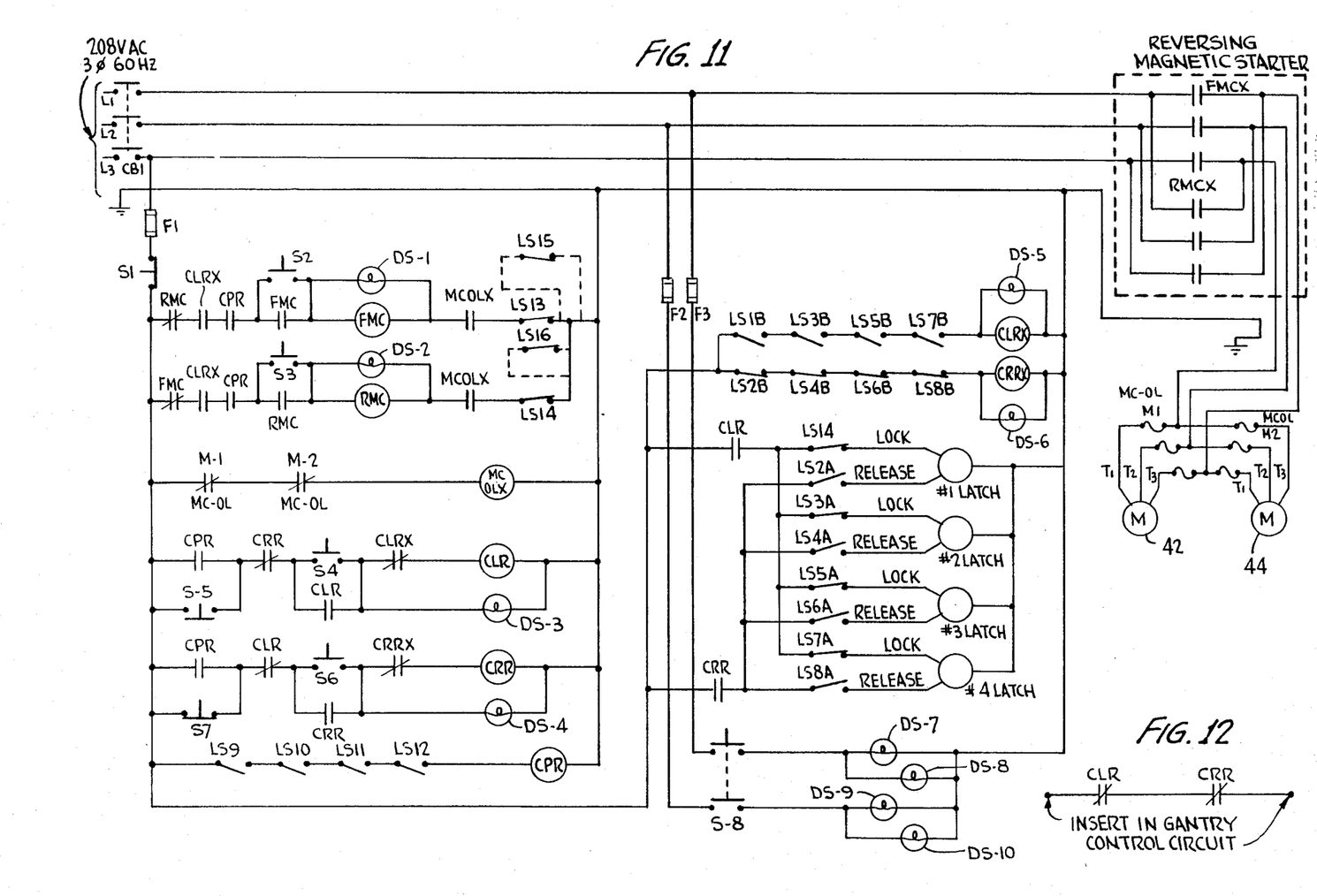
FIG. 11 is an electrical schematic diagram of the controls which are employed to control the tipping adapter of the present invention.
FIG. 12 is a schematic diagram of the interlocks which are inserted into the gantry control circuit in order to prevent movement of the gantry during a time that a container is being engaged or being released by the tipping adapter.

Tipping of the container is effected by selective operation of motors 42 and 44 simultaneously, as best illustrated in FIGS. 3 and 4 wherein elements are designated by the same reference numerals employed for those elements in FIGS. 1 and 2. The container is shown upright in FIG. 3 with the drive support member and pivotal frame member disposed in parallel relation. In FIG. 4, the container 41 and pivotal frame member are shown being pivoted counter-clockwise relative to the drive support member for the purpose of pouring the contents of container 41. The motors 42 and 44 are capable of being driven in both clockwise and counter-clockwise directions to effect the desired direction of rotation of the container. The motors operate over a full 360° so that the contents of container 41 can be dumped in a single actuation of the motors wherein the container is moved continuously through a 360° path. Alternatively, the motors can be actuated to drive the container through only 180° before stopping so that the container can be held in an upside down position. These features, as described below in relation to the electrical system illustrated in FIG. 11, are included in the preferred embodiment. It will be understood, however, that it is possible to include circuitry which would permit the motors to stop at any point in the rotational path, if so desired.

Figures 5, 6, 7, 8:
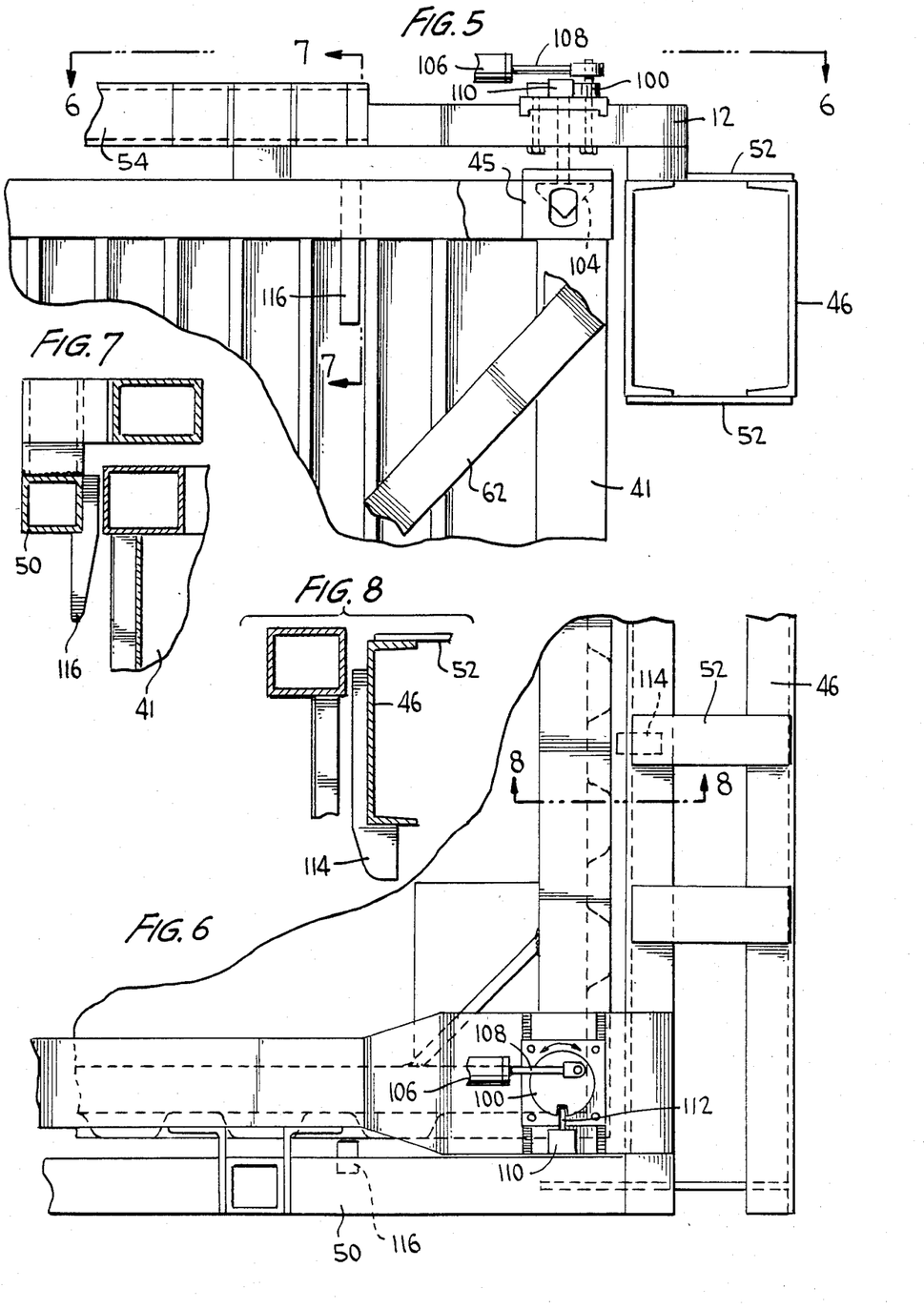
FIG. 5 is a detailed partial end view taken along lines 5—5 of FIG. 1.
FIG. 6 is a detailed partial top view taken along lines 6—6 of FIG. 5.
FIG. 7 is a view in section taken along lines 7—7 of FIG. 5.
FIG. 8 is a view in section taken along lines 8—8 of FIG. 6.

Referring to FIGS. 5 and 6, the engagement between twist lock members 58 of the pivotal frame member 12 and the lock-receiving members 45 of the container are illustrated in detail. It will be appreciated that the engagement between the spreader 43 and support drive member 10 is substantially identical. The twist lock members 58 include a rotary lock plate 100 from which a shaft 102 depends and is extendable through a slot (not visible in the drawings) in the top of the lock-receiving member 45. Shaft 102 terminates in a widened head 104 which fits through the top slot in the lock-receiving member 45 in one rotational orientation of shaft 102, but which does not so fit when the shaft is rotated by 90°. The head 104 can thus be inserted into the lock-receiving member 45 and then rotated 90° so as to be retained in that member. Rotation of the twist lock is achieved by means of an electrically driven motor 106 having a shaft 108 which is translatable by the motor to effect 90° rotation of the rotary lock plate 100. In order to sense the lock/unlock condition of the twist locks, a switch box 110 is associated with each twist lock assembly. Switch box 110 may be a conventional four-pole limit switch manufactured by the Square D Company as Model C64BW. A sensing rod 112 extends from the switch box 110 and cooperates with a radially-extending slot defined at the periphery of rotary lock plate 100 to sense the rotational position of that plate within its 90° limits.

Referring to FIGS. 6, 7 and 8, as noted above, the pivotal frame member sides 46, 48 are disposed alongside the top edges of the container sides when the pivotal frame member 12 is positioned to be secured to the container. In order to assure proper positioning and smooth placement of the pivotal frame about the container periphery, a plurality of guide members 114 are secured at spaced locations to the sides 46 and 48. Likewise, guide members 116 are secured at spaced locations along ends 50. These guide members have canted surfaces facing the container which guide the pivotal frame over the top edges of the container is the pivotal frame is lowered from the gantry onto the container.

Figures 9, 10:
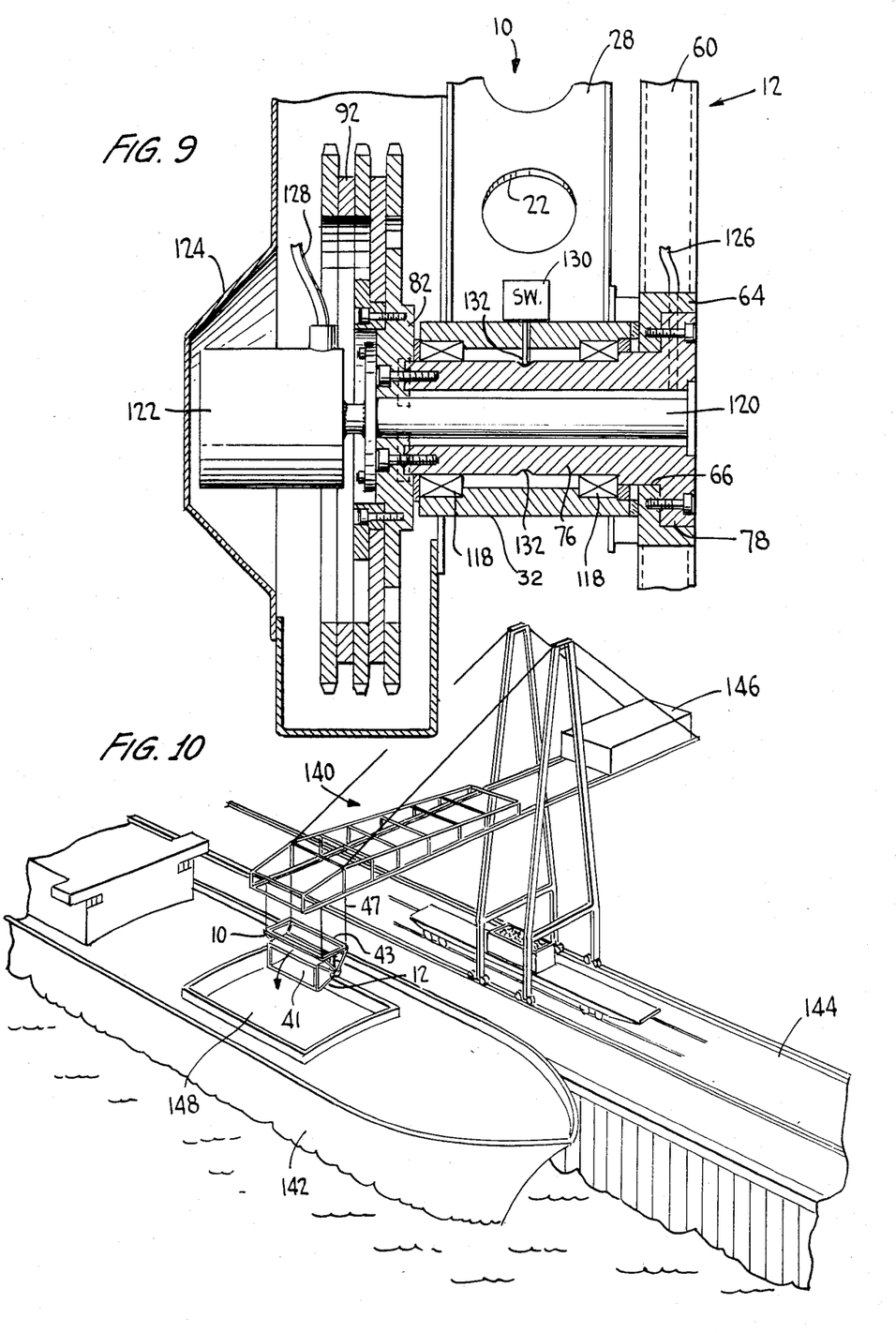
FIG. 9 is a detailed view in section taken along lines 9—9 of FIG. 3.
FIG. 10 is a view in perspective of a container-handling port facility modified with the tipping adapter of the present invention and showing a container in the midst of a tipping operation.

The detailed view of FIG. 9 illustrates the engagement described above of the driven shaft 76 to plate 64 and to the rotatably driven plate 82. The stationary sleeve 32 is illustrated surrounding the hollow driven shaft 76 and spaced therefrom by means of annular bushings 118. In addition, the hollow interior of driven shaft 76 is disposed about a wiring conduit 120 which rotates with the driven shaft and pivotal frame 12. The conduit 120 carries electrical wiring from the switch boxes 110 to a slip ring assembly 122 disposed within a housing 124 for the drive transmission 80. Wiring is run from the switch boxes 110 to the conduit 120 via a cable 126 which is passed through suitable openings defined in plate 64 and flange 78. Wiring for the slip ring assembly 122 is run via a cable 128 to the gantry cab.

Also illustrated in FIG. 9 is a limit switch box 130 which is secured to the drive support frame 10 and from which a sensor arm, such as a spring-loaded, axially-translatable plunger, extends. The sensor arm extends through a suitable aperture in sleeve 32 into contact with driven shaft 76. The driven shaft 76 has a pair of recesses 132 defined in its periphery at 180°-spaced locations in alignment with the axis of the sensor arm of switch box 130. The sensor arm thus projects a greater outward distance than otherwise when the recesses 132 are aligned therewith to effect opening of the control contacts in the switch box 130. The elements illustrated in FIG. 9, which are disposed at one end of the adapter assembly, are understood to be repeated at the other end; illustration of the identical components at the other end of the assembly is not provided in order to simplify the description provided herein and to facilitate and understanding of the invention.

Referring now to FIG. 10, the present invention is illustrated in a typical operational mode in conjunction with a gantry cantilever crane 140 disposed at a dock 144 and having a gantry cab 146. A ship 142 is positioned adjacent dock 144 and has its hold 148 open to receive bulk material. The gantry is positioned above the open hold and a container 41 is shown tipped by tipping the pivotal frame member 12 relative to the drive support member 10. It should also be understood that the container 41 may be loaded directly into the hold so that the ship transports the bulk material within the container. A gantry would then be used at the destination to tip the contents of the container into a land transport vehicle. It should be understood that the containerized bulk material can, therefore, remain containerized throughout the entire transport process and be emptied by means of a tipping adapter at the ultimate destination.

The circuitry for electrically controlling the operation of the tipping adapter described hereinabove is illustrated schematically in FIG. 11. The circuitry operates on three-phase, 60 Hz, 208 volt, AC power appearing on three power lines L1, L2 and L3, all of which are referenced to a ground line. All three power lines are passed through respective contacts FMCX of the forward motor control relay FMC to respective power input terminals of the three-phase tipping motors 42 and 44 connected in parallel. The power lines L1, L2 and L3 are also connected through respective contacts RMCX of the reverse motor control relay RMC to the supply terminals of motors 42 and 44; however, the connections through the relay contacts RMCX are in phase opposition to the connections through relay contacts FMCX. Each of the three input lines to each of the motors 42 and 44 has a bimetal overload sensor MC-OL (M1 in the case of motor 42, M2 in the case of motor 44) in series therewith to sense current overloads in the lines.

A first set of control relay circuits is actuated by the voltage across power line L3 and ground. These control circuits are commonly fused with fuse F1 which is connected in series with an emergency stop switch S1. The operator can depress the emergency stop switch S1 to terminate a tipping operation at any time. One of the control relays which is operated from the L3 power line is the forward motor control relay FMC. The relay is actuated when the forward rotation control switch S2 is closed and each of the following conditions exists: the reverse motor control relay RMC is not actuated; the "locks fully engaged" relay CLRX is actuated and the "container in position" relay CPR is actuated; the "no motor overload" relay MC-OLX is actuated; and switch LS13 is closed. Switch LS13 is one of the contacts in the switch box 130 (FIG. 9) and is open only when the switch box senses that the motor has rotated 360°. When all of these conditions exist, current is passed through the FMC relay and through the indicator lamp DS-1 which indicates that the forward rotation operation is proceeding. Energization of the FMC relay closes the FMC contact in parallel with switch S2 so that the FMC relay is latched into its energized state after the momentary actuation of switch S2.

The reverse motor control relay RMC is operated in response to a set of analogous conditions. Specifically, the RMC relay is actuated when the reverse rotation control switch S2 is momentarily actuated and the following conditions exist: the FMC relay is not actuated; the CLRX relay is actuated; the CPR relay is actuated; the MC-OLX relay is actuated; and switch LS14 is closed. Switch LS14 opens at the ±360° position of container rotation as does switch LS13. Relay RMC is latched into its energized state by one of its RMC contacts connected in parallel with the momentarily actuated switch S3. A lamp DS-2 is energized when the RMC relay is energized to indicate that the reverse rotation mode of motor operation is proceeding.

The MC-OLX relay is energized as long as there is no motor overload in the supply lines to the motors 42 and 44. This is achieved by placing the contacts M1 and M2 in series with the winding of the MC-OLX relay.

The CLR relay is energized whenever the locking mechanism between the pivotal frame member 10 and the container 41 are in the process of being engaged. Energization of this relay is initiated by pressing the container lock switch S4 which effects energization of the relay when the following conditions exist: the CPR relay is energized, indicating that the tipper adapter is on the container in position to permit locking; the container release relay CRR is not energized; and the CLRX relay is not energized, indicating that the container is not fully locked in its connection to the pivotal frame member 12. When the CLR relay is energized, one of its CLR contacts, connected in parallel with switch S4, latches the relay in its energized state. The CPR contact in the energization line for relay CLR is connected in parallel with an emergency bypass switch S5 which permits this contact to be bypassed in emergency conditions even when the tipper is not properly positioned on the container. An indicator light DS-3 indicates that the container locks are in the process of being engaged when this lamp is energized.

The container release relay CRR is energized by actuation of the container relay switch S6 when the following conditions exist: the CPR relay is energized; the CLR relay is not energized; and the CRRX relay is not energized, indicating that the locking mechanism between the container and the tipper adapter is not fully released. The CRR relay is latched into its energized state by means of one of its contacts connected in parallel with the momentarily actuated container release switch S6. An emergency bypass switch S7 is connected in parallel with the CPR contact in order to permit emergency energization of the CRR relay even when the CPR relay is not energized. An indicator lamp DS-4 is lit to indicate that the locks for the container are in the process of being released.

The CPR relay is energized when each of switches LS9, LS10, LS11 and LS12 are closed. These switches close only when the tipper is on the container and correspond to plunger-type spring-loaded switches which are disposed to project downwardly from support bars 54 and 56 to be actuated when the pivotal frame member 12 contacts the rim of the container. Energization of relay CPR is, therefore, an indication that the tipper is properly positioned on the container.

The CLRX relay, which is intended to be closed when the locks for the container are fully closed, is energized when each of switches LS1B, LS3B, LS5B and LS7B are closed. These switches correspond to one pole of each of the four switch boxes 110 which sense the rotational position of the rotatable plate 100 as part of locking mechanism 58. When all four rotatable plates 100 are sensed as being in their locked position, relay CLRX is energized and is associated lamp DS-5 is lit.

The CRRX relay is energized when the four switches LS2B, LS4B, LS6B and LS8B are closed. These switches correspond to an additional pole in each of the four switch boxes 110 and they are closed only when the rotary plate 100 associated with the twist lock switches are in their fully released position. Under such circumstances, the CRRX relay is energized and its associated indicator lamp DS-6 is lit.

The CPR relay is energized when each of switches LS9, LS10, LS11 and LS12 are closed. These switches close only when the tipper is on the container and correspond to plunger-type spring-loaded switches which are disposed to project downwardly from support bars 54 and 56 to be actuated when the pivotal frame member 12 contacts the rim of the container. Energization of relay CPR is, therefore, an indication that the tipper is properly positioned on the container.

The CLRX relay, which is intended to be closed when the locks for the container are fully closed, is energized when each of switches LS1B, LS3B, LS5B and LS7B are closed. These switches correspond to one pole of each of the four switch boxes 110 which sense the rotational position of the rotatable plate 100 as part of locking mechanism 58. When all four rotatable plates 100 are sensed as being in their locked position, relax CLRX is energized and its associated lamp DS-5 is lit.

The CRRX relay is energized when the four switches LS2B, LS4B, LS6B and LS8B are closed. These switches correspond to an additional pole in each of the four switch boxes 110 and they are closed only when the rotary plate 100 associated with the twist lock switches are in their fully released position. Under such circumstances, the CRRX relay is energized and its associated indicator lamp DS-6 is lit.

The motors 106 for actuating the rotatable plates 100 in the locking mechanism 58 are designated in the schematic diagram of FIG. 11 as #1 latch, #2 latch, #3 latch and #4 latch. These motors are actuated to lock the locking mechanism 58 whenever the CLR relay is closed and an appropriate pole of the corresponding switch box 110 is closed to indicate that the corresponding locking mechanism is not fully locked. Thus, the #1 latch is rotated in a locking direction When the CLR relay is energized in response to actuation of the container lock switch S4, and remains actuated until switch LS1A is opened after the switch box 110 senses that the rotatable plate 100 is in its fully locked position. Switch contact LS3A serves the same purpose for the #2 latch as does the switch contact LS1A for the #1 latch, it being appreciated that the switch contact LS3A and the switch contact LS1A are associated with different switch boxes and different latching mechanisms. Similarly, switch contact LS5A controls the locking operation for the #3 latch and switch contact LS7A controls the locking operation for the #4 latch. These latch motors are driven in the release direction when the CRR relay is energized by actuation of the container release switch S6 and when respective switch contacts LS2A, LS4A, LS6A and LS8A are closed. These contacts are open only when the corresponding latching mechanisms are fully released so that they remain closed when the corresponding locking mechanisms are locked, are in the process of being locked or are in the process of being released. Similarly, switch contacts LS1A, LS3A, LS5A and LS7A are open only when their corresponding locking mechanisms are fully locked; therefore, these contacts are closed when the corresponding locking mechanisms are fully released, in the process of being released, or in the process of being locked.

The system is provided with flood lights DS7, DS8, DS9 and DS10 which are actuable by means of the flood light actuator switch S8. These lights permit operation at night and do not constitute part of the control interlock arrangement.

The circuit illustrated in FIG. 12 is connected in series in the gantry control circuit to prevent motion of the gantry under certain circumstances. Specifically, the gantry movement is inhibited unless the CLR relay and the CRR relay are not energized. This serves the function of preventing movement of the gantry during a time that the locks for the container are being engaged or being released.

The system described hereinabove is unique in that it serves as an adapter to be inserted between a gantry-supported container spreader and the container, or between any suspended container and its support, so as to permit the container to be selectively tipped whereby its containerized bulk materials can be poured therefrom. Since conventional container loading gantry systems are not designed for tipping, the tipping adapted of the present invention expands the capability of container handling ports to include the handling of bulk materials.

It should be noted that the drive support member 10 and the pivotal frame member 12 are described herein as being frame members rather than solid members or some other configuration. It is believed that frame members provide the most desirable configuration in terms of both structure and minimal weight; however, other structures may readily be employed for these members within the scope of this invention as long as they include one member which is secured to the gantry-supported spreader, another member which is secured to the container, and means for rotating the two members, one relative to the other, so that the container may be tipped and its contents poured therefrom.

The electrical wiring, motors, fixtures and the like are all provided with explosion-proof considerations in mind and are of the Class 2, Group F certified equipment type.

The contacts LS1A, LS1B through LS8A, LS8B, which are part of the switch boxes 110, are designed to be switched only during the last three degrees of movement of the rotatable plate 100.

With reference to FIG. 11, it is noted that switches LS15 and LS16 are shown in phantom lines as part of the actuation circuits for relays FMC, RMC, respectively. These switches open at ±180° of container rotation and are used only when it is desirable to provide a 180° stroke for the tipping actuator motor. Where a full 360° actuating stroke is employed, the switches LS15 and LS16 are omitted from the circuit. If the 180° stroke is desired, the switches are inserted into a break in the circuit line at the points illustrated in FIG. 11.

The controls illustrated in FIG. 11 are provided in a panel in the gantry control cab. When the operator wishes to tip the container clockwise, he actuates the forward rotation switch S2 to actuate the forward motor control relay FMC. When the operator wishes to rotate the container counterclockwise, he actuates the reverse rotation control switch S3 to energize the reverse motor control relay RMC. When the operator wishes to lock the container to the tipper adapter, he actuates the container lock switch S4 to energize the container lock relay CLR. Likewise, in order to release the container from the tipper adapter, the operator actuates the container release switch S6 to energize the container release relay CRR. The emergency stop switch S1 disables all of the relays FMC, RMC, MCOLX, CLR, CRR, CPR, CLRX and CRRX in the event of an emergency condition. In addition, the #1 latch, #2 latch, #3 latch and #4 latch, which correspond to motors 106, are disabled by actuation of the emergency stop switch S1.

In a normal sequence of operation, the spreader 43 is normally connected to the drive support member 10 of the tipper adapter. Electrical connections are made in the gantry cab such that the controls illustrated in FIG. 11 are operable by the operator. This is usually achieved by connecting an electrical connector in the cab. The operator then maneuvers the gantry, with the adapter suspended therefrom, to dispose the pivotal frame member over the cargo container to be lifted and then engages the locking mechanisms to secure the container to the adapter. The gantry hoisting controls are then operated to lift the container and translate it to the desired dumping location at which point the controls of FIG. 11 are employed to tip the container in either 180° increments or a continuous 360° path. The status of the adapter at any time is indicated by the various indicator lamps DS1–DS6.

It must be stressed that the principles of the present invention relate to an adapter for tipping any suspended container, regardless of the nature of the support. In other words, a container spreader need not be employed nor must the support structure be a gantry cantilever crane. As long as the container is suspended in the air, the principles of the present invention permit it to be tipped by rotating relatively pivotal parts of a tipping adapter. Thus, any hoisting apparatus can be adapted to tip bulk material from a suspended container by connecting the tipping adapter of the present invention between it and the container.

While a specific embodiment of the invention has been described, it will be clear that variations of the details of constructions which are specifically illustrated and described may be resorted to without departing from the true spirit and scope of the invention as defined in the appended claims.

What is claimed is:

1. A method of pouring bulk material from a cargo container into a receiving area comprising the steps of:
    securing the cargo container to a crane by means of a separable tipping adapter unit having a drive support member mounted on the crane and a pivotal member mounted on the support member to pivot on a horizontal axis, the pivotal member being releasably secured to the top of the cargo container with the horizontal pivot axis extending through the cargo container;
    hoisting the tipping adapter unit, with the cargo container secured thereto, by means of the crane and suspening the cargo container above the receiving area; and
    pivoting the pivotal member relative to the support member through a pivot angle of at least 90° to pivot the cargo container about the horizontal pivot axis and pour the bulk material into the receiving area.

2. The method according to claim 1 wherein aid step of securing the cargo container to the crane includes the step of securing the pivotal member to the cargo container by inserting spaced twist lock members, which depend from the pivotal member, into respective spaced lock receiving openings disposed proximate respective corners of the cargo container and
    rotating the twist lock members within the respective lock receiving openings to engage the twist lock members in the openings.

3. The method according to claim 2 further comprising the step of inhibiting movement of said crane when the twist lock members are in the process of either engaging or disengaging their respective lock receiving openings.

4. The method according to claim 1 wherein, in said step of pivoting, said pivot angle is at least 180°.

5. The method according to claim 1 wherein, in said step of pivoting, said pivot angle is 360°.

6. The method according to claim 1 further comprising the step of inhibiting pivoting of the pivotal member unless the cargo container is firmly secured to the pivotal member.

7. The method according to claim 1 wherein said pivot axis extends at least proximate to the center of gravity of the cargo container.

8. The method according to claim 1 wherein, in said step of pivoting, the cargo container can be selectively pivoted in either of two rotational directions about said pivot axis.

9. A method according to claim 1 wherein said step of securing the cargo container to the crane includes securing a container spreader to the crane and mounting the drive support member of the tipping adapter unit on the container spreader.

10. Apparatus for delivering bulk material from a cargo container carrying lock receiving means to a designated area by tipping the cargo container comprising:
    a drive support member carrying means for securing said drive support member to hoisting means, said drive support member having substantially horizontally extending beam means and spaced end support members depending from said beam means;

a single pivotal member pivotally mounted on and extending between said end support members of said drive support member to pivot on a horizontal axis disposed below said beam means and carrying locking means arranged for cooperation with the lock receiving means of the cargo container to provide primary support for the cargo container with said horizontal pivot axis passing through the cargo container and vertically offset from said locking means; and selectively actuable drive means for selectively pivoting said pivotal member about said horizontal pivot axis with respect to said drive support member.

11. The apparatus according to claim 10 further comprising
means for automatically inhibiting actuation of said drive means unless the cargo container is securely engaged to said pivotal member by said locking means.

12. The apparatus according to claim 11 further comprising means for inhibiting movement of the hoisting means when said locking means is in the process of engaging said pivotal member to the cargo container and when said locking means is in the process of disengaging said pivotal member from the cargo container.

13. Apparatus according to claim 10 wherein said pivotal member includes a side member for extending along a side wall of the cargo container to provide structural support during tipping.

14. Apparatus according to claim 10 wherein said pivotal member includes a frame for extending around the cargo container.

15. Apparatus according to claim 14 wherein said pivotal member includes guide members depending from said frame to position said frame around the cargo container.

16. Apparatus for delivering bulk material into a designated receiving space from a cargo container of the type including a generally rectangular, frame-like border surrounding an upper edge thereof and a plurality of spaced, lock-receiving openings disposed along the border, said apparatus comprising:
a drive support member;
a pivotal member;
engagement means for engaging said drive support member and said pivotal member for mutual pivotal displacement about a horizontal pivot axis;
a plurality of twist lock members depending from said pivotal member spaced to engage respective lock-receiving openings along the container border for selectively securing said pivotal member to the cargo container in fixed relation; and
selectively actuable drive means secured to said drive support member for selectively pivoting said pivotal member about said pivot axis with respect to said drive support member so as to pivot the container through an angle of at least 90° to dump the bulk material.

17. The apparatus according to claim 16 wherein said drive means comprises:
first and second drive motors secured to opposite ends, respectively, of said support member, each drive motor including a shaft Which is rotatable about a respective axis which is displaced from said pivot axis;
first and second longitudinally spaced driven shafts secured to respective opposite ends of said pivotal frame member and extending coaxially with said pivot axis; and
drive transmission means extending in driving engagement between each drive motor shaft and a respective driven shaft for transmitting rotational motion of said drive shaft to said driven shaft.

18. The apparatus according to claim 17 wherein both of the drive motor drive shafts and both driven shafts are rotatable through an angle of 360°.

19. The apparatus according to claim 17 wherein said drive transmission means comprises first and second endless gear trains extending between each drive shaft and a respective driven shaft.

20. The apparatus according to claim 17:
wherein said drive support member comprises a rectangular support frame with relatively short end members and relatively long side members, and a pair of generally V-shaped supports extending in respective planes oriented perpendicular to said support frames at respective opposite ends of said support frame, said V-shaped supports having their apices pointed away from said support frame and joined to respective coaxially disposed annular sleeve members; and
wherein said pivotal member comprises a rectangular pivotal frame and a pair of V-shaped gusset frames extending in respective planes oriented perpendicular to the pivotal frame at respective ends of that frame, said gussets having their apices pointed away from the pivotal frame and secured to a respective driVe shaft so as to be rotated therewith; and
wherein each drive shaft extends through a respective annular sleeve of said V-shaped supports to engage said drive transmission means.

21. The apparatus according to claim 16:
wherein said drive support member comprises:
a support frame member having opposite ends;
a pair of support members secured to respective opposite ends of said support frame member and projecting downwardly therefrom; and
a pair of sleeve members secured to the lowermost parts of respective support members;
wherein said pivotal member comprises:
a pivotal frame having opposite ends;
a pair of gussets secured to respective opposite ends of said pivotal frame and extending in parallel relationship to one another and out of plane with said pivotal frame; and
means secured to said gussets and extending through said sleeve member to engage said drive means.

22. The apparatus according to claim 16 for use with a container spreader suspended from a gantry cantilever crane and having locking members depending therefrom wherein said drive support member includes a plurality of lock-receiving openings having substantially the same configuration and spacing as the lock-receiving openings of the container border for receiving the respective locking members depending from the container spreader.

23. Apparatus according to claim 16 wherein said pivotal member includes a frame having side members extending around the side walls of the cargo container to provide structural support during tipping.

24. Apparatus according to claim 23 wherein said pivotal member includes guide members depending from said frame to position said frame around the cargo container.

25. Apparatus according to claim 16 and further comprising circuit means controlling operation of said selectively actuable drive means in response to proper securing of said pivotal member to the container.

26. Apparatus according to claim 25 wherein said circuit means includes switch means for operating said twist lock members.

27. A tipping adapter for use in connecting a cargo container to a cargo container spreader suspended from a gantry cantilever crane in order to permit selective tipping of the container for the purpose of pouring bulk material therefrom, the cargo container being of the type which has first portions of respective plural latching engagements disposed thereon in spaced relation, the container spreader having second portions of the plural latching engagements disposed thereon in spaced relation so as to permit selective engagment between the spreader and the container, said adapter comprising:
 a drive support member having disposed thereon plural first latching engagement portions which are spaced to provide selective engagement with the second latching engagement portions of the container spreader;
 a pivotal member having disposed thereon plural second latching engagement portions which are spaced to provide selective engagement with the first latching engagement portions of the cargo container;
 means for pivotally engaging said drive support member and said pivotal member for mutual rotation about a pivot axis; and
 motor means for selectively pivoting said pivotal member relative to said drive support member about said pivot axis.

28. The adapter according to claim 27 wherein said pivot axis extends longitudinally through said container.

29. The adapter according to claim 27 wherein said motor means is secured to said drive support member.

30. A method of modifying a container-handling port facility to handle bulk material, the container-handling port facility having a gantry cantilever crane conventionally used to move containers to and from ships, said method comprising the steps of:
 securing a tipping adapter unit to the gantry cantilever crane, the tipping adapter unit including a drive support member secured to the gantry cantilever crane and including substantially horizontally extending beam means and spaced end support members depending from the beam means, a single pivotal member pivotally mounted on and extending between the depending end support members of the drive support member and drive motor means for pivoting the pivotal member relative to the drive support member;
 attaching the pivotal member of the tipping adapter unit to a cargo container containing bulk material to provide primary support for the cargo container at a point vertically offset from the pivotal mounting to the depending end support members;
 hoisting the tipping adapter unit with the pivotal member carrying the cargo container and moving the tipping adapter unit carrying the cargo container to or from a ship to a receiving area using the gantry cantilever crane; and
 operating the drive motor means for the tipping adapter unit to pivot the pivotal member and the cargo container to pour the bulk material from the cargo container at the receiving area.

31. The method according to claim 30 and further comprising the step of controlling operation of the tipping adapter unit and the gantry cantilever crane from a gantry control cab.

32. The method according to claim 30 wherein said step of securing the tipping adapter unit to the gantry cantilever crane includes securing a container spreader to the gantry cantilever crane and securing the drive support member of the tipping adapter unit to the container spreader.

33. A tipping adapter for connection with a crane to deliver bulk material in a cargo container to a receiving area comprising
 a drive support member carrying means for securing said drive support member to the crane;
 a pivotal member having an upper frame carrying means for releasably engaging an upper portion of the cargo container, said pivotal member having depending end members extending downwardly from said upper frame and pivotally mounted on said drive support member to pivot said pivotal member about a horizontal pivot axis passing through the cargo container below said upper frame; and
 selectively actuable drive means for selectively pivoting said pivotal member about said horizontal pivot axis with respect to said drive support member.

34. The tipping adapter according to claim 33 wherein said upper frame of said pivotal member defines an opening for receiving the upper portion of the cargo container.

* * * * *